(12) United States Patent
Langberg (10) Patent No.: US 9,661,453 B2
(45) Date of Patent: May 23, 2017

(54) INTELLIGENT GOLF COURSE

(71) Applicant: FAIRWAYIQ, INC., Newton, MA (US)

(72) Inventor: Eric Aaron Langberg, Milford, PA (US)

(73) Assignee: FAIRWAYIQ, INC., Waltham, MA (US)

( * ) Notice: Subject to any disclaimer, the term of this patent is extended or adjusted under 35 U.S.C. 154(b) by 159 days.

(21) Appl. No.: 14/217,319

(22) Filed: Mar. 17, 2014

(65) Prior Publication Data

US 2014/0274155 A1    Sep. 18, 2014

Related U.S. Application Data

(60) Provisional application No. 61/802,426, filed on Mar. 16, 2013.

(51) Int. Cl.
*H04W 24/00*   (2009.01)
*H04W 4/02*    (2009.01)
*H04W 84/18*   (2009.01)

(52) U.S. Cl.
CPC ............. *H04W 4/02* (2013.01); *H04W 84/18* (2013.01)

(58) Field of Classification Search
CPC ... H04W 60/00; H04W 84/045; H04W 12/06; H04W 12/08; H04W 24/00; H04L 67/04; H04L 12/66; G06Q 20/32
USPC .. 455/456.3, 556.1, 412.1, 414.1, 41.2, 422, 455/434, 411; 709/229; 473/223, 409, 473/221
See application file for complete search history.

(56) References Cited

U.S. PATENT DOCUMENTS

| | | | | |
|---|---|---|---|---|
| 4,905,624 | A | * | 3/1990 | Krolzick ................. G09F 17/00 116/173 |
| 4,926,161 | A | | 5/1990 | Cupp |
| 5,086,390 | A | | 2/1992 | Matthews |
| 5,097,416 | A | | 3/1992 | Matthews |
| 5,305,201 | A | | 4/1994 | Matthews |
| 5,524,081 | A | | 6/1996 | Paul |
| 5,689,431 | A | | 11/1997 | Rudow et al. |
| 5,878,369 | A | | 3/1999 | Rudow et al. |
| 6,062,991 | A | | 5/2000 | Moriarty et al. |
| 6,102,817 | A | * | 8/2000 | Boswell ................. A63B 57/00 473/407 |
| 6,236,360 | B1 | | 5/2001 | Rudow et al. |
| 6,236,940 | B1 | | 5/2001 | Rudow et al. |

(Continued)

FOREIGN PATENT DOCUMENTS

FI    WO 2009068561 A2  *  6/2009  ............ H04W 48/08

*Primary Examiner* — Joseph Arevalo
(74) *Attorney, Agent, or Firm* — Sean D. Detweiler, Esq.; Morse, Barnes-Brown & Pendleton, P.C.

(57) ABSTRACT

An intelligent golf course system comprising at least a network comprised of nodes and deployed on a golf course, the golf course comprising a series of holes or playing areas; The golf course system includes a means for determining the physical location of a node on the golf course, a means for tracking a change in a physical location of a node on the golf course, and a portable display unit configured to display information to a user. At least some portion of the network communicates using a wireless communication means and wherein the information at least includes a distance from the display unit to a node on the golf course.

17 Claims, 6 Drawing Sheets

(56) References Cited

U.S. PATENT DOCUMENTS

| | | | |
|---|---|---|---|
| 6,346,055 B1* | 2/2002 | Rege | A63B 57/357 368/10 |
| 6,470,242 B1 | 10/2002 | Rudow et al. | |
| 6,525,690 B2 | 2/2003 | Rudow et al. | |
| 6,636,296 B1* | 10/2003 | Faulkner | G01C 3/22 33/277 |
| 7,137,100 B2* | 11/2006 | Iborra | G06F 8/30 717/104 |
| 7,242,294 B2* | 7/2007 | Warrior | H04B 7/18506 340/539.11 |
| 7,862,414 B2 | 1/2011 | Doaga et al. | |
| 8,083,617 B2 | 12/2011 | Greenquist et al. | |
| 8,517,850 B1* | 8/2013 | Beno | A63B 53/00 473/221 |
| 9,180,350 B2 | 11/2015 | Pringle et al. | |
| 2001/0045904 A1 | 11/2001 | Silzer, Jr. | |
| 2002/0016674 A1 | 2/2002 | Rudow et al. | |
| 2002/0072815 A1* | 6/2002 | McDonough | A63B 69/36 700/92 |
| 2002/0188359 A1 | 12/2002 | Morse | |
| 2003/0191547 A1 | 10/2003 | Morse | |
| 2005/0057370 A1* | 3/2005 | Warrior | H04B 7/18506 340/870.01 |
| 2006/0178110 A1* | 8/2006 | Nurminen | A63B 24/0021 455/41.2 |
| 2006/0240838 A1* | 10/2006 | Suh | H04W 16/32 455/454 |
| 2006/0276173 A1* | 12/2006 | Srey | H04W 12/08 455/410 |
| 2007/0008884 A1* | 1/2007 | Tang | H04L 29/06 370/230 |
| 2007/0171394 A1* | 7/2007 | Steiner | G01C 3/08 356/5.01 |
| 2008/0250478 A1* | 10/2008 | Miller | H04L 9/32 726/5 |
| 2009/0070694 A1* | 3/2009 | Ore | H04W 12/08 715/764 |
| 2009/0092111 A1* | 4/2009 | Horn | H04W 48/02 370/338 |
| 2009/0111602 A1* | 4/2009 | Savarese | A63B 24/0021 473/283 |
| 2009/0138303 A1* | 5/2009 | Seshadri | G06Q 10/087 705/1.1 |
| 2009/0268631 A1* | 10/2009 | Li | H04W 28/22 370/252 |
| 2011/0314145 A1* | 12/2011 | Raleigh | H04L 41/0893 709/224 |
| 2012/0004956 A1* | 1/2012 | Huston | G06Q 30/0207 705/14.1 |
| 2012/0289354 A1* | 11/2012 | Cottam | A63B 63/3658 473/223 |
| 2013/0178311 A1* | 7/2013 | Peterson | A63B 57/0075 473/406 |
| 2013/0217519 A1* | 8/2013 | Cottam | A63B 69/3658 473/409 |
| 2014/0011603 A1* | 1/2014 | Pennington | A63B 69/3661 473/278 |
| 2014/0329613 A1 | 11/2014 | Savarese et al. | |
| 2014/0339110 A1 | 11/2014 | Soracco et al. | |
| 2015/0065271 A1* | 3/2015 | Peterson | A63B 24/0075 473/406 |
| 2016/0129332 A1* | 5/2016 | Davenport | A63B 69/3632 473/223 |
| 2016/0166902 A1* | 6/2016 | Day | A63B 60/46 473/223 |

* cited by examiner

INTELLIGENT GOLF COURSE

PRIORITY

This application claims priority to U.S. Provisional Application 61/802,426, filed on Mar. 16, 2013, which is hereby included in its entirety by reference.

BACKGROUND OF THE INVENTION

The present invention is in the field of golfing and systems and devices to aid the game of golf. More specifically, the invention relates to an asset-aware communications network that provides information to a golfer to assist in playing the game of golf. The system has additional benefits regarding asset location and data communications which the golf course management may use to track and improve the movement of assets throughout the golf course.

SUMMARY OF THE INVENTION

A golf course comprises a series of "holes", each consisting of a "teeing ground" or "tee", a "fairway", the "rough" and other "hazards", and a "green" with a flagstick ("pin") and a "cup", all designed for the game of golf. A standard round of golf consists of playing eighteen holes, although some golf courses have only nine holes with the course played twice per round to provide a final score based on eighteen holes. Other courses have more holes than eighteen, such as twenty-seven or thirty-six holes and players choose two groups of nine holes each, providing novelty, and also easing maintenance since some groups of holes can be closed while the course remains open. Additionally, par-3 courses also exist, consisting of nine or eighteen holes, all of which are par 3, where "par" is the number of strokes considered standard for a scratch golfer. The area covered by a typical championship golf course is in the range of 100 to 150 acres of land, with the total length of play in the range of roughly 6500 to 8200 linear yards, or roughly 4.7 miles. Many courses include a membership office based at the course, usually based in a club house, which typically provides a pro shop selling golf accessories.

As the game is played, the golfer strikes a golf ball with a golf club, counting the number of strokes required to advance the ball from the teeing ground to the cup. The total number of strokes required over the 18 holes comprises the golfer's score for the round of golf. The lower the number of total strokes, the better the score. When preparing to strike the ball on any given stroke, the golfer must consider a number of factors, including the distance between the ball location and other features of the course, such as bends in the fairway, hazards, the rough, and ultimately the flagstick or pin location. In addition to distance, the golfer must assess how hard or lightly the wind is blowing, and in what direction, since a strong wind can change the ball direction from a straight line to an arc, thereby pushing the golf ball off its original line of flight. Before each strike of the ball, the golfer needs to know how far to attempt to hit the ball, where to aim the ball, and how to correct for environmental conditions such as wind speed, wind direction, temperature, etc. The golfer then chooses a certain golf club from a set of clubs to provide the desired elevation and distance for the stroke.

A number of accessories exist to aid the golfer in decision-making, including binoculars and distance measuring devices, such as range finders. Range finders typically use optics, laser light, or global positioning systems to help the golfer determine the distance to and between various features and objects on the golf course. As noted, the golfer particularly needs to know the distance from a particular ball location to the pin.

The current distance measuring technologies have various strengths and weaknesses. Laser measurement requires visible line of sight between the golfer and the target, typically the pin. In addition, the golfer must be able to hold the laser steadily on the target, which is more difficult at longer distances. Global positioning systems (GPS) are also used for determining location on a golf course, but also have some weaknesses. A golf GPS is a satellite-based mapping device. It communicates with overhead satellites to pinpoint the golfer's location on the Earth and then uses previously recorded locations on the golf course to tell the golfer the distance to any important locations near the golfer, for example the front of the green for the hole the golfer is playing.

An advantage of a golf GPS unit is that the golfer doesn't have to aim it at a target to get a yardage reading. This can be an advantage if, for example, the target is not in the line of site, the hole is on an elevated green or the golfer is behind a tree or bush. Additionally, the golfer doesn't need to have a steady hand or accurate eye to line up a GPS unit like he/she would with a laser range finder. GPS units, however, do not function well with overhead obstructions and there can be a delay getting satellite information, slowing game play. In addition, GPS units vary in accuracy from approximately three feet to a worst case of roughly thirty feet, with accuracy dependent on the quality of satellite reception. This variation can be quite significant since the difference between getting the ball in the cup and missing can be fractions of an inch.

As noted above, a laser rangefinder is quite different from a GPS unit. It is an optical device which falls somewhere between a pair of binoculars and a laser gun that would be used to measure speeding drivers by a highway patrol officer. The optical system, much like a rifle scope, allows a golfer to select and lock onto the target object for distance measurement, for example a flag stick on a green. Then the golf rangefinder shoots an "eye safe" laser at the target, and measures the time it takes for the laser to bounce off the target and return to the rangefinder. From this time delay, the rangefinder can calculate accurately how far away the target is. The latest model laser range finders include optical magnification. This can be very useful, not only for guiding the laser to get accurate yardage measurements to the target, but also for helping the golfer visibly locate preferred spots to land the golf ball. For example, from 175 yards away with the naked eye, it is impossible to locate a ridge on a green that should be avoided. With an optically magnified range finder, the golfer could spot it easily and play safely to the other side of the green, resulting in an easier final stroke or "putt". The ability to visually assess the target area is generally not found with GPS units.

Radio frequency (RF) technology may also be used to measure distance. In a manner analogous to laser range finding, a radio frequency signal is transmitted from one device with a transceiver (transmitter/receiver) to another device with a transceiver, which then sends back a return signal. Again the time delay between sending the initial signal and receiving a return signal, called time of flight, is used to calculate the distance the signals had to travel to complete the send/received loop. Since radio frequency signals travel at the speed of light, rapid measurements may be made, however RF has the advantage of not requiring line of sight. The distance between one transceiver and a second transceiver can be measured even with obstructions, such as trees, between the transceivers.

Additionally, RF technology has a significant advantage in that the system may include bidirectional data capability, something which is not available with current GPS or laser technologies. The bidirectional capability means that either end point, or transceiver, has the ability to send and receive signals. Since RF signals are being sent, this means the possibility exists for the signals to carry messages or establish a data communication link between the end points or other devices.

Other means of determining distance exist with ultrasound technology, employing oscillating sound pressure waves above the range of human hearing. Sound pressure waves are transmitted toward a target and the reflections measured to determine the distance. Ultrasound's unique non-linear propagation properties enable such methods as measuring phase shift and/or propagation time differences between different ultrasonic frequencies transmitted simultaneously. This works because the propagation of signals in air depends on the frequency of the signal. The phase shift between two or more signals can be used to calculate the distance through air the signals had to travel to reach the target and return.

Signal strength of RF signals decreases over distance. For long distance transmission of RF signals, the transmitted power must be increased to compensate for this effect. The decrease of signal strength can be used to calculate distance as well. If a device is transmitting known signal strength, the receiver can measure the received signal strength and determine the loss in strength due to the distance traveled. Signal strength can be affected by other factors besides distance, so the accuracy is not very good compared to some of the other techniques already discussed. However, when multiple transmitters and/or multiple receivers are employed, the accuracy can be greatly improved through techniques such as triangulation. With triangulation, the signal strength is measured at multiple receivers and the results processed to determine which ones were closer (higher signal strength) and which were further (lower signal strength) from the transmitter. If the locations of the receivers are known relative to each other, the location of the transmitter relative to the receivers can be determined by using relative signals strengths to establish how far the transmitter is from each receiver. Alternatively, multiple transmitters can transmit a signal and the receiver can compare the relative signal strengths to determine its own distance to each of the transmitters and thereby determine its own location relative to known locations of the transmitters.

Additional transceivers add another significant value from a communications standpoint. As discussed above, RF signal strength decreases over distance. For a transmitted signal to reliability reach a distant receiver, the signal strength (transmitter power) must be increased. The extra power required puts a drain on the power supply (batteries or AC power) of the transmitter. In the case described above with the hand-held device and flag stick, a certain power level is required for the transmitter in the handheld device and the transmitter in the flag stick. By introducing additional transceivers, the transceivers can be configured into a network so they are able to communicate with each other. The individual network transceivers are commonly called "nodes". If the nodes are able to communicate with each other, messages can be passed from node to node so the transmitter only needs to have enough power to reach the closest node, not reach all the way across the distance to a remote node, in order to send a message. This concept enables data communications around the world, where an electrical or RF signal does not need to travel directly from New York to Los Angeles on a dedicated wire or RF link to transmit a message. The message can be communicated over shorter wires, or transmitted over shorted RF links, and passed along until it reaches the final destination. Nodes can be interconnected in a variety of ways to form a network.

Data communications simultaneous with distance measurement provides significant additional capabilities to a distance measurement system. For example, the flag stick can have an integrated transceiver, which can communicate with a separate hand-held or golf cart mounted transceiver to share data. Data items like environmental conditions at the pin (for example wind speed and direction) can be communicated to the golfer at the ball location and the golfer can adjust his/her shot accordingly. The data communication link also enables the golfer to tell the pin to turn on a light for better visibility in low atmospheric light conditions, as described in published US patent application US20100160057 titled Illuminated Flagpole.

One shortcoming of US20100160057 is that communications, including distance measurement, is limited to the flagpole and a device used by a golfer. This means the system is unable to provide additional information to the golfer about the golfer's location relative to other objects on the course, such as hazards. The system is also fails to provide data other than that related to a particular shot or inquiry by a golfer at a particular time and place.

Each node described above is equipped with a means of identification. This can include such things as visible indicators such as signs or lights, radio frequency identification (RFID) tags, bar codes, digital addresses, etc. Any mobile node may then be tracked by reading the identifier as the node is moved throughout an area or region. For example, a node with a bar code may be scanned in one location, moved to a new location and scanned again. The system would then update to store the new location so location is available for subsequent queries. The bar code example demonstrates a passive system, which requires user input to track a node. Active systems are also available, which are able to determine the location of, and track, a mobile node as it moves throughout an area or region. For example, air traffic control systems are able to track an airplane through a combination of radio frequency transmitting identifiers (transponders), which identify the plane and communicate certain data about the plane, and radar, which determines the distance and location of the plane relative to the radar system.

Various networking technologies are available for data communications. Mesh networking, for example, is known in the industry and is a type of data communications networking where each "node" or end point in the network must not only capture and disseminate its own data, but also serve as a relay for other nodes, that is, it must collaborate to pass along the data in the network. Data is generally sent with proper identifiers to identify the sending node and the proper receiving node. Messages or data is communicated throughout the network by identified paths, using routing techniques to pass along messages from one node to another until it reaches the intended recipient, or by flooding, where a message is sent to all the nodes in the network, including those to whom it was not intended. The nodes for which the message was not meant simply ignore the message.

A routing network must be able to self-heal in order to enable connection and reconfiguration around broken or blocked paths. The self-healing capability enables a routing based network to operate when one node breaks down or a connection goes bad. The resulting network is typically quite reliable, since more than one path is usually available between a sender and a receiver on the network.

Routing networks include the challenge of maintaining system awareness of the possible routing channels. Flooding does not require the maintaining awareness of routing channels, but the system can be overwhelmed if flooded with too many messages, causing data collisions. Flooding, however, improves system performance in relation to RF propagation since nodes have different physical spatial relationships and therefore different propagation paths. This increases robustness for handling interferences, obstructions and other negative physical propagation affects while virtually eliminating a single point of failure for the network.

Mesh networks demonstrate one type of ad-hoc network. Mobile ad hoc networks (MANET) are similar to mesh networks, but MANET implementations include solutions to the problems introduced by the ability of the nodes to move in physical relation to each other.

Typical data communications networks employ internet protocol (IP) to manage the transmission and delivery of packets of data. The IP structure enables proper addressing of devices or nodes in the network through unique identifiers. Each IP packet includes a header that includes the source, the destination and some descriptive information about the data, as well as the data itself. The wide standardization of IP networks enables data transmission across both wired and wireless networks, including Ethernet and Wi-Fi (IEEE-802.11) as well as others.

A wireless sensor network (WSN) is an extension of a typical data communications network which includes special features to allow easy introduction of various nodes specifically for monitoring assets or the environment. A typical WSN comprises nodes, gateways, and software, and may employ aspects of mesh networking, MANET, or other networking techniques to maintain reliable communications throughout the network.

As mentioned above, a significant advantage of a network containing multiple nodes is that the power required for each node to operate and transmit reliably on the network is reduced for each node added to the network. For a network distributed over a large geographical area, such as a golf course, this is an important consideration. Rather than a remote node having to transmit directly all the way across the course to the club house, for instance, the remote node only needs to transmit to the next closest node, which transmits the message to the next nearby node, and the process is repeated until the message reaches the club house, significantly reducing the required transmit power. This significant reduction in transmit power means a remote node can reliably operate much longer from a low power source, such as a battery or solar power. By optimizing the network for low power consumption at the individual nodes, while minimizing data communications complexity, processing power and cost are also reduced for each node.

The invented system includes the deployment of a wireless network with multiple nodes across a golf course to form an intelligent golf course. By integrating distance measurement, data communications, and node location through a communications network, a fully intelligent golf course is realized, whereby the system is aware of the location of fixed and moving nodes on the course. The system may be constructed such that certain nodes may communicate directly with each other, while other nodes remain invisible to each other. This allows certain communications to take place locally, such as a golfer on a particular hole requesting distance to the pin, while other communications, such as a severe weather alert, may be communicated system-wide. An intelligent golf course could provide useful information to individual golfers to assist with playing the game of golf, while simultaneously providing information to course management about the location and movement of nodes, such as golfers, golf carts, maintenance equipment, etc., to better coordinate the operations of the course and improve overall efficiency.

In one embodiment, the invented system comprises a data communications network, node location software, distance measurement technology, stationary nodes, and mobile nodes.

In an embodiment, the data communications network communicates, at least in part, via industry standard wireless means, for example Wi-Fi (IEEE 802.11) or Wi-MAX (IEEE 802.16).

In an embodiment, the system further includes links to standard wireless communications links, such as Wi-Fi, Bluetooth, cellular, infrared, etc, employed in consumer devices such as portable computers, tablets, cell phones, headphones/headsets, etc.

The invented system is an asset-aware system which has the capability of individually identifying all the assets (nodes) in the system and the ability to determine the physical location of each asset (node) in real-time or with minimal delay.

An object of the invention is to provide a golf course with internet access from any point on the course.

Another object of the invention is to provide a system which can provide data communications between wireless devices throughout a golf course.

Another object of the invention is to provide a system which can provide a link between a central command system and various nodes on the golf course, including individual golfers or small groups of golfers.

A further object of the invention is to provide a system which enables a golf course operator to acquire data related to the use of the course during game play, the status of individual assets distributed throughout the course, communication with players on the course, and other interactive features.

DETAILED DESCRIPTION OF THE INVENTION

The invented system comprises a golfer interface device, one or more featured nodes, and one or more support nodes wherein the golfer interface device, the featured node(s), and the support node(s) comprise a data communications network. The system may include a central command system which is able to access or control the network to send and receive data or messages, track the physical location of system nodes, and provide overall coordination of the system.

The golfer interface device comprises at least a housing, a data display, an input interface, a power supply, a radio frequency transceiver and a microprocessor and is configured to function as a node on a network. The golfer interface device may optionally further include data storage. The golfer interface may optionally include expanded capabilities with the addition of optics, global positioning technology, laser measurement technology, sensors, and/or audio interface. The golfer interface device may be powered by rechargeable batteries, solar power, or other power means.

A featured node comprises at least a housing, a power supply, a radio frequency transceiver, a microprocessor and a visual indicator. Featured nodes may optionally include a variety of sensors to provide additional information to the golfer or the golf course operator. Optional sensors may include wind speed, wind direction, temperature, humidity, moisture content of soil, rain gage, ambient light conditions, or other environmental data.

A support node comprises at least a housing, a power supply, a radio frequency transceiver and a microprocessor. Optionally, a support node may include one or more sensors.

Each node, including the golfer interface device, also contains an identifier or asset tag, which may be a physical device, such as a semiconductor, circuit, a combination of components or which may be a virtual asset tag existing as a digital address for identification on a network.

A central command system comprises at least a microprocessor, a power supply, and a means for accessing the network. The central command system may optionally include one or more display devices or other output devices, input devices, data storage, or audio interface.

Deployment of the invented system includes the creation of a wireless mesh network across a golf course to form an intelligent golf course. By deploying nodes distributed throughout the course, messages may be transmitted from any location on the course to any other location on the course. The wireless mesh network provides consistent coverage of the course through the use of distributed low power transceivers.

The featured nodes and support nodes may be powered from rechargeable batteries, solar power, wind power, a power distribution network, or other power means.

The featured nodes may be queried directly by the golfer interface device to determine distance from the ball location to featured elements of the course, such as the flag stick. The featured nodes may also provide data or information to the golfer or course operator based on data collected by various sensors deployed on the featured nodes or support nodes.

The support nodes are used specifically to enhance coverage of the system, while aiding in the calculation of ball location over localized portions of the course. For instance, a group of support nodes deployed on the fairway may be used to calculate the location of the golfer on the fairway, independently from direct measurement of distance from the pin. This enables to golfer to not only establish distance to the pin, but also distance to other features of the course, such as hazards. The localized distance measurement can also help the golfer establish the distance of each shot. If the golfer takes a reading before a shot, then takes a reading at the final ball location, the shot distance may be easily calculated. Support nodes may be deployed on the teeing ground, the fairway, at specific hazards, as well as on or around the green to provide localized and relative distance measurements. If a golfer records each shot, the golfer interface device or software located elsewhere in the system, such as at the central command, can store the readings so the golfer can review at the end of the round and instantly know the score for that round.

A fully deployed system brings a myriad of feature possibilities. The bidirectional communication with every asset (golfer display devices, featured nodes, support nodes, and the central command center), give the course operator access to information that is not possible with any other system available. Through a fully enabled yet locally defined network, the course operator can control dispatching of tee times, monitor speed of play, run reports to analyze player bottlenecks on the course, monitor course conditions, send weather alerts to golfers on the course, send audio alerts to each or every golfer display device, or communicate other information to golfers on the course.

The system may also provide a fully distributed Wi-Fi network enabling a golfer to access the Internet, send and receive email, and perform all other connected activities the golfer is familiar with. The network access provided to the golfer may include targeted advertising from the golf course itself or other suppliers of products and services.

For the golfers, the system provides essential data about game play, distance and environmental conditions, with additional features as well. The system can provide emergency communication between golfers on the course and the club house, enable ordering of refreshments or additional balls while on the course, track shot placement and its impact on the score, etc.

Figure 1:
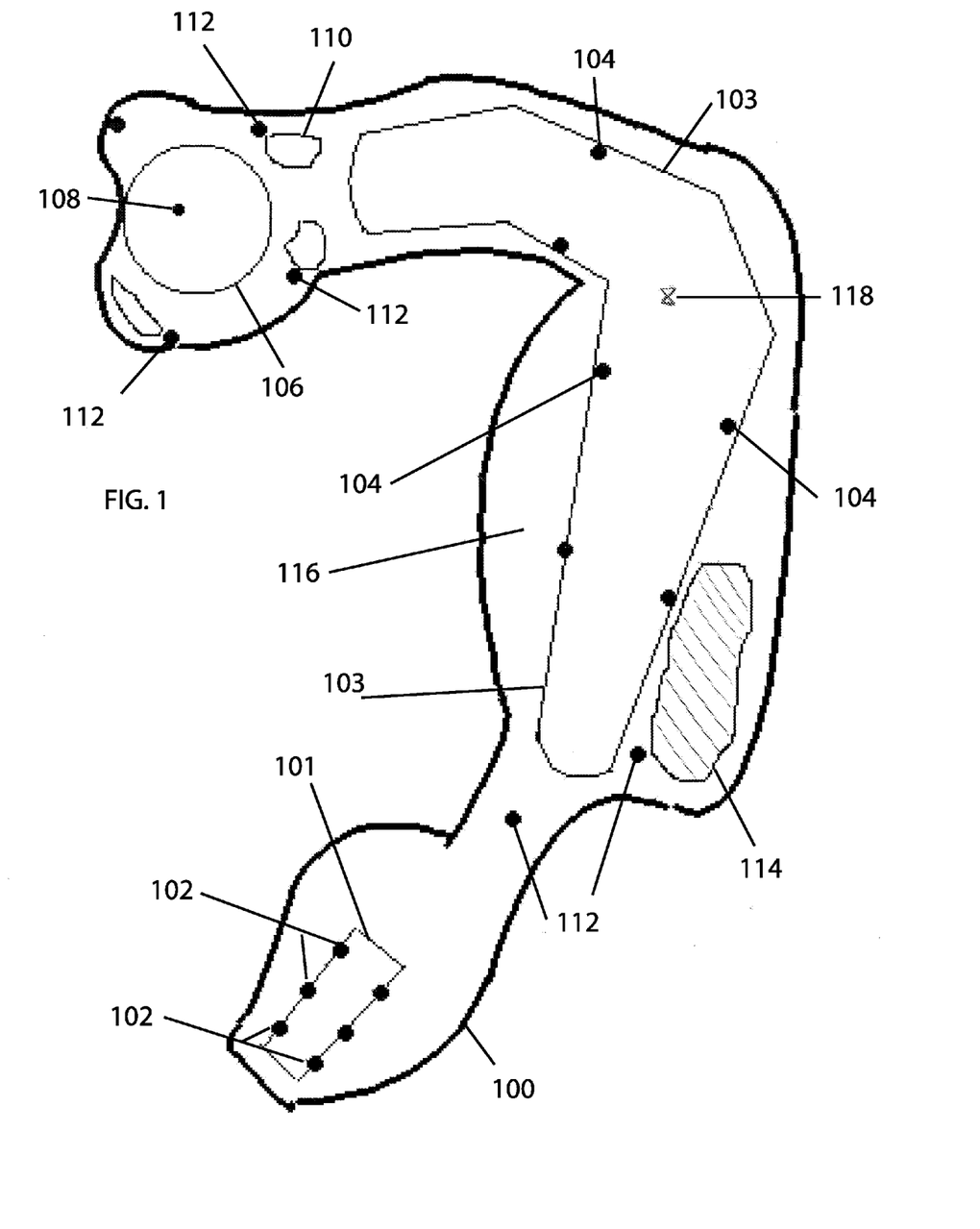
FIG. 1 shows a single hole on a golf course with the invented system.

FIG. 1 shows a top down view of a single hole on a golf course the hole has a border 100 which defines the out-of-bounds region of the hole. The hole is comprised of three main areas, the teeing ground 101, the fairway 102, and the green 106. The land 116 around these areas is the rough. The teeing ground 101, fairway 103, and green 106 generally have much shorter and higher density grass than the areas in the rough. The green 106 includes a cup with a flagstick 108. Teeing markers 102 are set at specific distances on the teeing green to indicate predefined teeing locations. Range markers 104 are set on the fairway at specific distances from the green to provide a visual point of reference for a golfer to estimate location and range. Hazards such as water 114 and sand traps 110 may be at any location within the hole.

In addition to the standard features, FIG. 1 includes the introduction of support nodes 112, which provide additional communication notes for signal integrity and determination of distances through RF measurement techniques. Teeing markers 102 and range markers 104 may selectively or totally replaced by support nodes, which provide the same visual reference, but also provide the additional benefits of the support nodes. The flagstick 108 may include a featured node for direct communication with a golfer display device 118 to provide direct distance calculation.

Figure 2A:
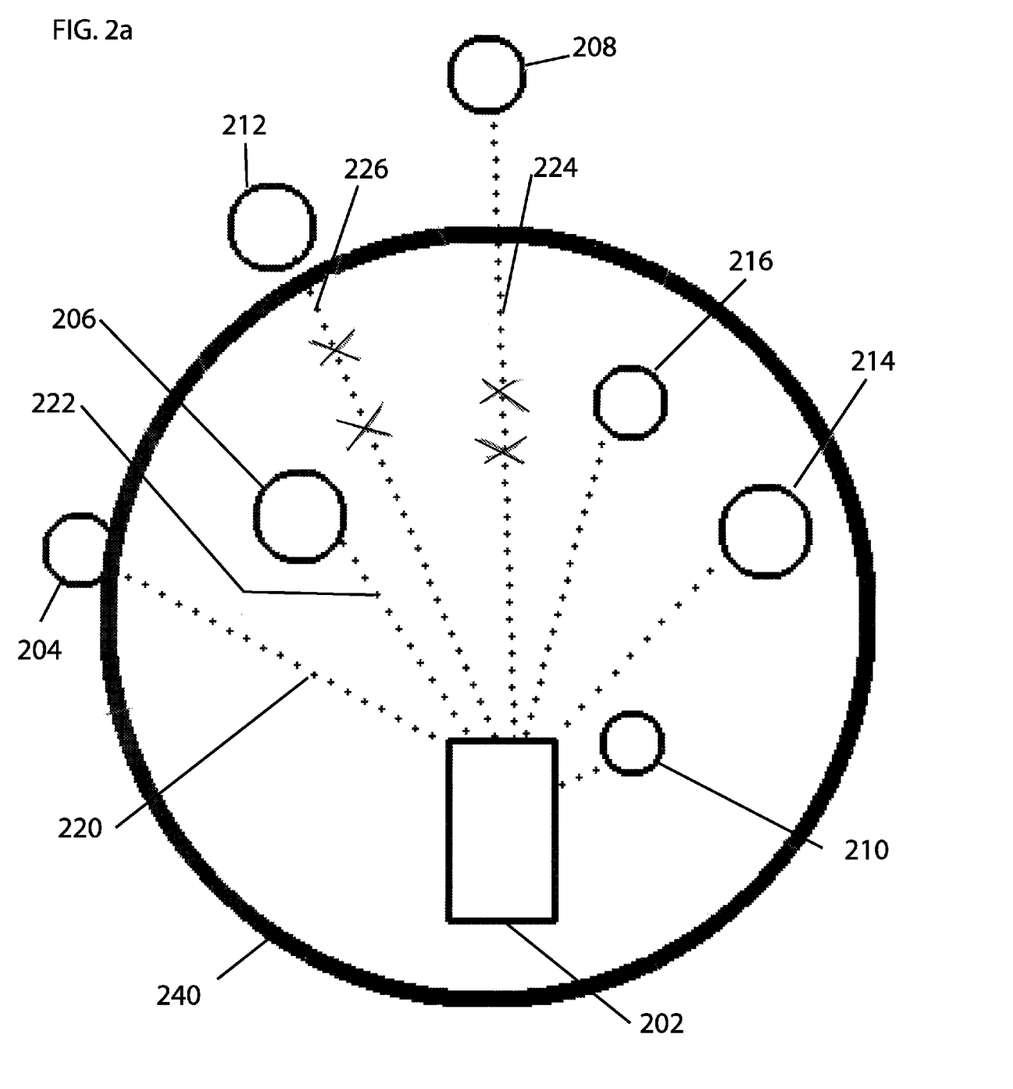
FIG. 2a shows a diagram of connections in a simple traditional communications network.

FIG. 2a shows a diagram of a traditional communications network. Each node 204, 206, 208, 210, 212, 214, 216 represents an individual device on the network and these devices are each individually connected to a central device 202 with a direct communication link. The devices represented by the nodes do not communicate directly with each other. As an example, there is no direct communication link between node 204 and node 206, however each node can communicate with device 202, which can elect to share a message from one node 204 to another node 206. The large circle 240 represents the maximum range of device 202 for reliable communications with an individual node. Notice that nodes 212 and 208 fall outside the maximum range so communication links 224 and 226 may be unreliable if communications can be established at all.

Figure 2B:
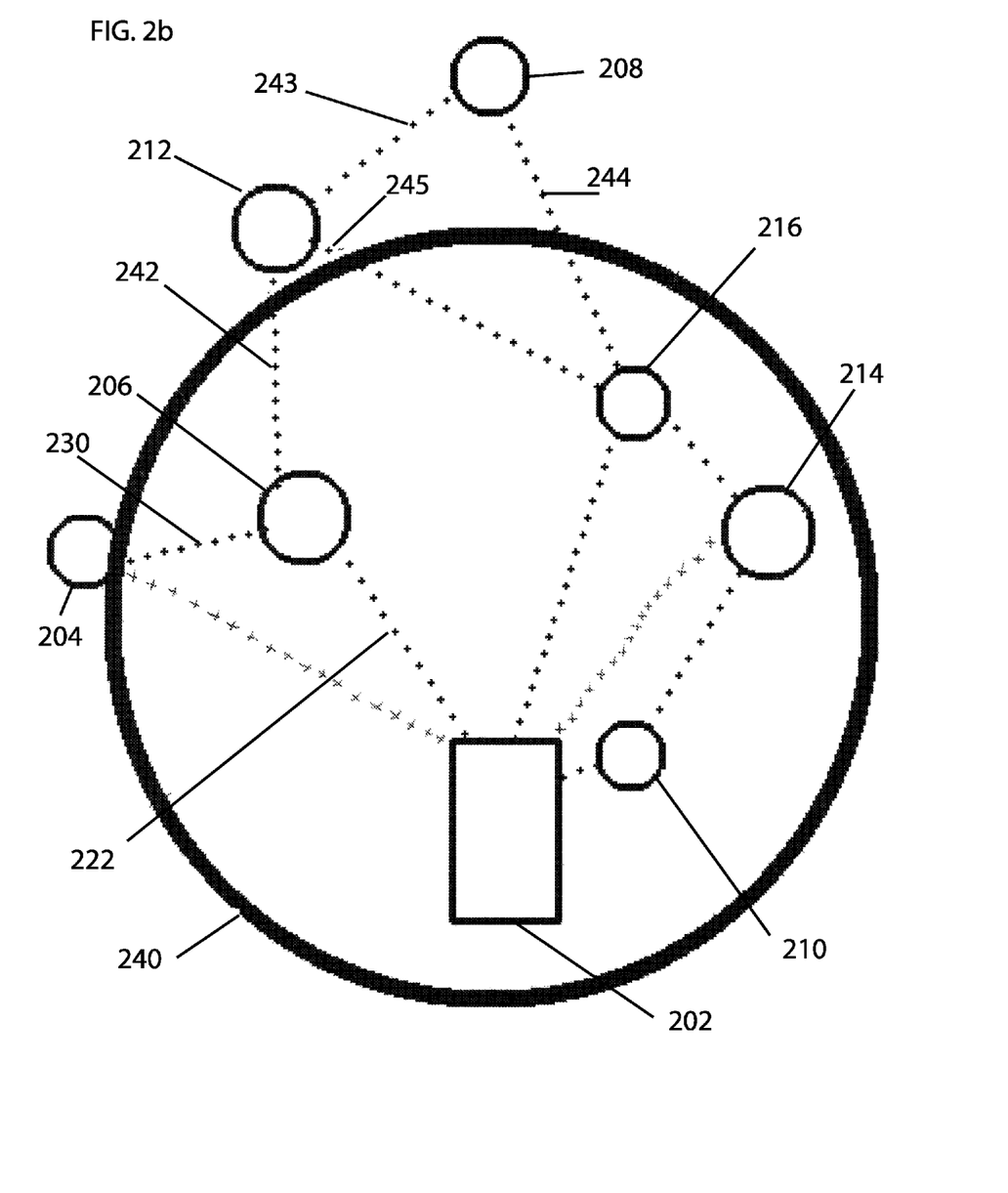
FIG. 2b shows a diagram of connections in a simple mesh network.

FIG. 2b shows the same arrangement of devices, with the network configured as a mesh network. In this case, any nodes 206 through 216 which are capable of communicating with each other establish local communication links, such as link 230 between node 206 and 204, in addition to link a link with device 202. The ability of the nodes to communicate with each other increases the reliability of a message getting from one node to another or from device 202 to one of the nodes. For example if device 202 needs to communicate with node 214, there is only one link in the traditional model shown in FIG. 2a. Using the mesh network approach in FIG. 2B, there are at least five possible links that can get the message through. By way of example, the message could be routed through node 206, then to node 212, onto node 216, and then to node 214. Another benefit can be seen for nodes 208 and 212, which were outside the reliable range of device 202. Nodes 212 and 208 are able to be reliably included in the network through communication links 243 through 245. In a mesh system deployed on a golf course, the nodes on a particular hole do not only communicate with nodes on that hole, but they can also communication with nodes on adjacent holes, meaning messages can travel around the entire golf course from hopping from node to node as needed.

Figure 3:
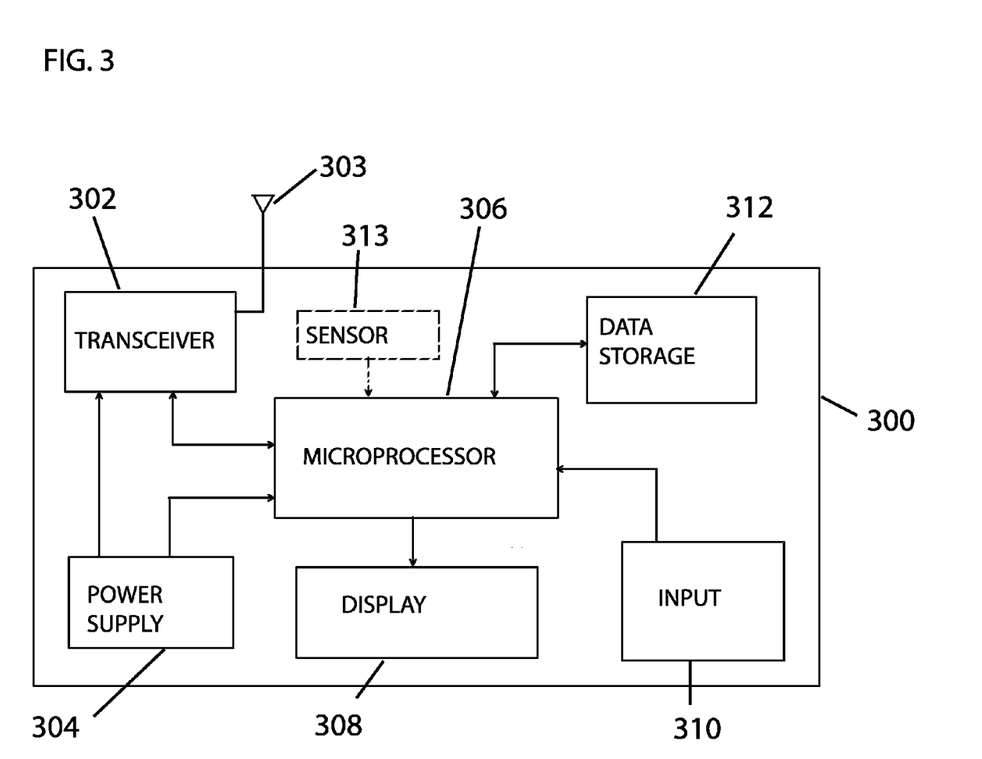
FIG. 3 shows an block diagram of a golfer display device

FIG. 3 shows a block diagram of a golfer display device, which includes transceiver 302 which communicates using radio frequency technology via antenna 303. The device also includes a power supply 304, which for portability will include rechargeable batteries. Microprocessor 306 is connected to transceiver 302 for bidirectional communication of data and to data storage 312 for long-term storage of data. Input 310 allows the user to interact with the microprocessor 306, with the output from the microprocessor provided to the user through the display 308, which may be an integrated display or individual indicators. The golfer display device may also include one or more sensors 313 for detecting environmental conditions or motion of the device. All items are housed in housing 300.

Figure 4:
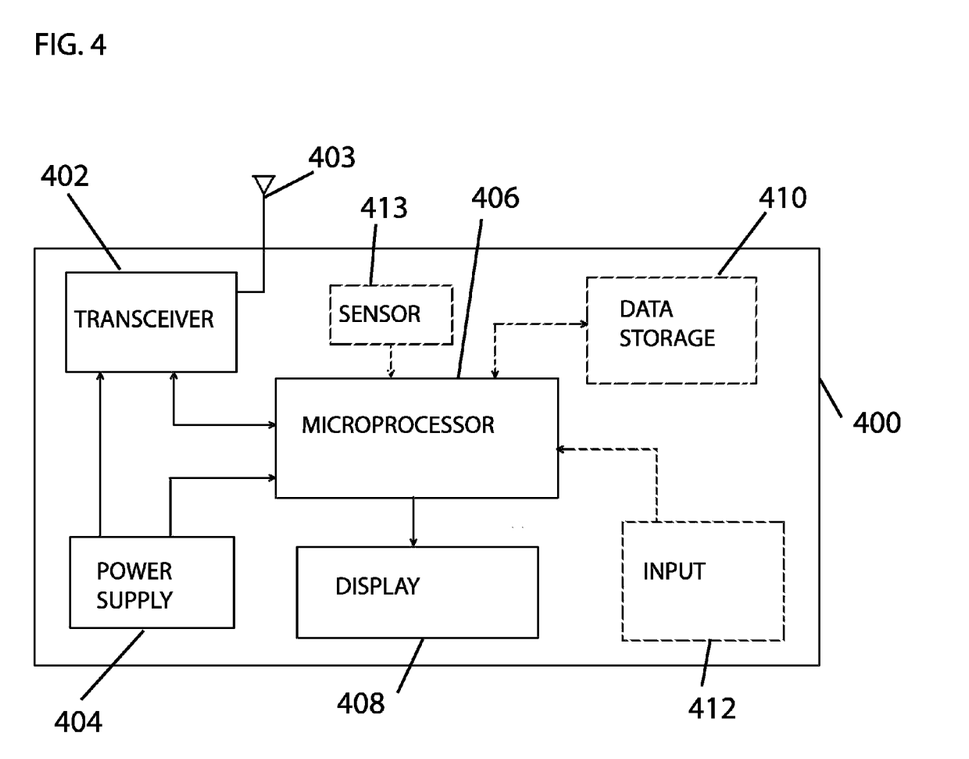
FIG. 4 shows a block diagram of a featured node

FIG. 4 shows a block diagram of a featured node contained in housing 400. The featured node includes microprocessor 406, power supply 404, display or indicator 408 and transceiver 402 which is connected to antenna 403 for bidirectional data communications. The featured node may also include one or more sensors 413 for detecting environmental conditions or motion. The featured nodes are specific target locations, such as the pin, which may be queried by the golfer via the golfer display device to obtain information.

Figure 5:
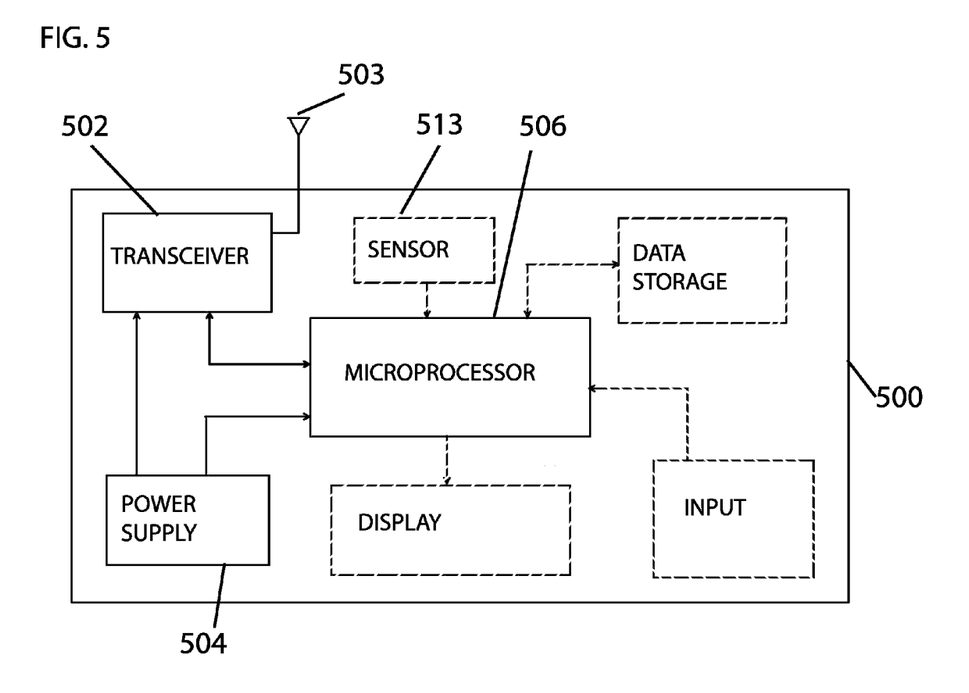
FIG. 5 shows a block diagram of a support node.

FIG. 5 shows a block diagram of a support node contained in housing 500. The support node contains microprocessor 506, power supply 504, and transceiver 502 which is connected to antenna 503 for bidirectional communications. The support node may also contain one or more sensors for detecting environmental conditions or motion of the device. The support node functions to extend the communications range or improve the overall location accuracy, but generally is not directly addressable by the golfer.

The system comprises at least one network, and optionally may include multiple networks. One of the networks should be an ad-hoc network where nodes may join the network or leave the network without affecting the performance of the entire network.

In one embodiment, the system comprises an IP-based network where at least part of the network is connected using wireless connection means. The system comprises a local area network arranged so that nodes physically within the bounds of a single hole on a golf course are interconnected, but are substantially isolated from nodes that are physically located on a different hole on the golf course. In this manner, each hole on the golf course has its own independent local area network, which may be configured as a standard IP-based network, as a mesh network, as a MANET network, as a WSN, or any other configuration of nodes. Each hole is then connected, through a router or bridge which can communicate with the network on each hole, to the master network, forming a wide area intelligent golf course system. Certain assets (nodes), particularly mobile assets, on a particular hole may be visible to the master network for asset tracking. Fixed location assets may or may not be visible to the master network.

I claim:

1. A communication and location system comprising:
   at least one featured node physically located at a flagstick on each hole on a golf course;
   at least one golfer interface device in direct communication with the at least one featured node;
   wherein the at least one featured node and the at least one golfer interface device of the system are physically deployed on the golf course; and
   wherein the system is configured such that a golfer utilizes the at least one golfer interface device to communicate directly with a feature node of the at least one featured node located at a particular hole to assist the golfer in determining a location of the golfer relative to the feature node located at the particular hole.

2. The system of claim 1, further comprising a support node configured to communicate with the at least one featured node and the at least one golfer interface device to improve reliability of messages sent by the at least one featured node, the at least one golfer interface device, or both.

3. The system of claim 2, further comprising:
   a central command;
   wherein the central command communicates with multiple featured nodes, multiple support nodes, and multiple golfer interface devices to determine a physical location of feature nodes, support nodes and golfer interface devices throughout the golf course.

4. An intelligent golf course system, comprising:
   at least one network comprising a plurality of nodes deployed on a golf course, the golf course comprising a series of holes or playing areas;
   a means for determining a physical location of a particular node of the plurality of nodes on the golf course;
   a means for tracking a change in the physical location of the particular node on the golf course; and
   a portable display unit configured to display information to a user;
   wherein at least some portion of the network communicates using a wireless communication means;
   wherein each of the plurality of nodes on the golf course includes an address;
   wherein the information includes at least a distance from the portable display unit to the particular node on the golf course;
   wherein at least a portion of the at least one network is configured as an ad-hoc network;
   wherein individual nodes of the plurality of nodes establish individual data communication links with one or more other nodes of the plurality of nodes within communication range in such a way that a message originating with an origination node that is of direct communication range with an intended destination node is communicated between the individual nodes by passing the message along a series of the individual data communication links until the message reaches the destination node; and the destination node is identified by a unique identifier associated therewith, the unique identifier being contained in the message.

5. The system of claim 4, further comprising a sensor contained in the particular node on the golf course configured to sense an environmental condition or movement of the particular node on the golf course.

6. The system of claim 5, further comprising multiple local networks, each having independent nodes and communication means.

7. The system of claim 6, wherein each hole in the series of holes or playing areas has at least one featured node.

8. The system of claim 7, wherein each hole or area in the series of holes or playing areas has at least one support node.

9. The system of claim 8, further comprising a master network configured to communicate with the local networks and wherein the master network is configured to communicate with the particular node on the golf course using the address of the particular node on the golf course.

10. A networked communication system for deployment on a golf course comprising:
a plurality of nodes;
a first featured node deployed on the golf course, the first featured node comprising a microprocessor, a transmitter, a receiver, and a unique identifier for identification of the first featured node on a network;
one or more support nodes deployed on the golf course, each of the one or more support nodes comprising a microprocessor, a transmitter, a receiver and a unique identifier for identification of the support node on a network;
a golfer interface device configured as a moving node on the network, the golfer interface device comprising a housing, a data display, an input interface, a power supply, a radio frequency transceiver and a microprocessor;
wherein the system is enabled to determine a location of the golfer interface device on the golf course;
wherein at least a portion of the network is configured as an ad-hoc network;
wherein individual support nodes of the one or more support nodes establish individual data communication links with one or more other support nodes of the one or more support nodes within communication range in such a way that a message originating with an origination support node that is of direct communication range with an intended destination support node is communicated between the individual support nodes by passing the message along a series of individual data communication links until the message reaches the destination support node; and
the destination support node is identified by a unique identifier associated therewith, the unique identifier being contained in the message.

11. The system of claim 10, wherein a localized distance measurement between the golfer interface device and at least one support node of the one or more support nodes is calculated and the localized distance measurement is used to improve accuracy of a distance between the first featured node and golfer interface device.

12. The system of claim 10, further configured to relay messages using multiple support nodes and wherein the system is configured as a mesh network.

13. The system of claim 10, wherein the golfer interface device comprises a cell phone or tablet computer.

14. The system of claim 10, wherein the system is configured to:
transmit the calculated distance to the golfer interface device in a message; and
wherein the golfer interface device is configured to receive the message and indicate the distance on the data display.

15. The system of claim 10, further comprising:
a central command;
wherein the central command communicates with multiple featured nodes, multiple support nodes, and multiple golfer interface devices; and
wherein the central command is configured to track a physical location of one or more of the multiple featured nodes, the multiple support nodes, and the multiple golfer interface devices throughout the golf course.

16. The system of claim 10, wherein:
the first featured node, the golfer interface device, and at least one of the one or more support nodes in combination are a data communication network for communication of data; and
the data communication network uses at least one distance measuring means to calculate a result which represents distance between the first featured node and the golfer interface device.

17. The system of claim 10, further comprising:
a means for determining a physical location of a particular node of the plurality of nodes on the golf course; and
a sensor contained in the particular node on the golf course configured to sense an environmental condition or movement of the particular node on the golf course.

* * * * *